US010737216B2

(12) United States Patent
Ito et al.

(10) Patent No.: US 10,737,216 B2
(45) Date of Patent: Aug. 11, 2020

(54) DEHUMIDIFIER

(71) Applicants: Mitsubishi Electric Corporation, Tokyo (JP); Mitsubishi Electric Home Appliance Co., Ltd., Saitama (JP)

(72) Inventors: Daisuke Ito, Tokyo (JP); Hideaki Maeyama, Tokyo (JP); Hiroshi Nakamura, Saitama (JP)

(73) Assignees: Mitsubishi Electric Corporation, Tokyo (JP); Mitsubishi Electric Home Appliance Co., Ltd., Saitama (JP)

( * ) Notice: Subject to any disclaimer, the term of this patent is extended or adjusted under 35 U.S.C. 154(b) by 29 days.

(21) Appl. No.: 15/767,482

(22) PCT Filed: Dec. 15, 2015

(86) PCT No.: PCT/JP2015/085035
§ 371 (c)(1),
(2) Date: Apr. 11, 2018

(87) PCT Pub. No.: WO2017/103987
PCT Pub. Date: Jun. 22, 2017

(65) Prior Publication Data
US 2018/0296973 A1    Oct. 18, 2018

(51) Int. Cl.
*B01D 53/26* (2006.01)
*F25B 30/02* (2006.01)
(Continued)

(52) U.S. Cl.
CPC .............. *B01D 53/265* (2013.01); *F24F 3/14* (2013.01); *F24F 3/1405* (2013.01); *F25B 13/00* (2013.01);
(Continued)

(58) Field of Classification Search
CPC ......... B01D 53/265; B01D 5/00; B01D 2259/4508; F25B 13/00; F25B 30/02;
(Continued)

(56) References Cited

U.S. PATENT DOCUMENTS 5,181,392 A * 1/1993 Itoh .................... F24F 3/153
62/160
5,628,125 A * 5/1997 De'Longhi ............ F24F 1/022
34/469
(Continued)

FOREIGN PATENT DOCUMENTS

CN    102767870 A  * 11/2012  ............ F24F 1/0358
JP       10176839 A  *  6/1998
(Continued)

OTHER PUBLICATIONS

International Search Report of the International Searching Authority dated Feb. 23, 2016 for the corresponding International application No. PCT/JP2015/085035 (and English translation).
(Continued)

*Primary Examiner* — Emmanuel E Duke
(74) *Attorney, Agent, or Firm* — Posz Law Group, PLC (57) ABSTRACT

A dehumidifier includes: a housing; a refrigerant circuit configured to allow low GWP refrigerant to circulate therethrough, the refrigerant circuit including a compressor having a variable operating frequency, a condenser, a pressure reducing device, and an evaporator, which are provided in the housing, the low GWP refrigerant being flammable and having a value of GWP of 6 or less; a blowing fan, which is provided in the housing, and is configured to take in air in a room into the housing and cause the taken-in air to pass through the evaporator and the condenser before blowing out the air from the housing into the room; and a water storage tank, which is provided below the evaporator, and is configured to accumulate dew condensation water generated
(Continued)

in the evaporator, a number of refrigerant paths passing through the evaporator being greater than a number of refrigerant paths passing through the condenser.

9 Claims, 5 Drawing Sheets

(51) Int. Cl.
*F24F 3/14* (2006.01)
*F25B 13/00* (2006.01)

(52) U.S. Cl.
CPC ...... *F25B 30/02* (2013.01); *B01D 2259/4508* (2013.01); *F24F 2003/1446* (2013.01); *F25B 2400/071* (2013.01); *F25B 2400/12* (2013.01); *F25B 2600/021* (2013.01); *F25B 2700/02* (2013.01)

(58) Field of Classification Search
CPC ............ F25B 2400/071; F25B 2700/02; F25B 2600/021; F25B 2400/12; F24F 3/14; F24F 2003/1446; F24F 3/1405; D06F 58/206; F25D 1/0443
See application file for complete search history.

(56) References Cited

U.S. PATENT DOCUMENTS

| | | | |
|---|---|---|---|
| 2013/0098576 A1* | 4/2013 | Fujitaka | F24F 1/0007 165/11.1 |
| 2016/0040094 A1 | 2/2016 | Kaneko et al. | |
| 2016/0061475 A1* | 3/2016 | Ito | F24F 3/1411 62/140 |

FOREIGN PATENT DOCUMENTS

| | | | | |
|---|---|---|---|---|
| JP | H10-238894 A | | 9/1998 | |
| JP | 2002-221349 A | | 8/2002 | |
| JP | 2002221349 A | * | 8/2002 | |
| JP | 3829625 B2 | | 10/2006 | |
| JP | 2015013253 A | * | 1/2015 | |
| WO | WO-9314353 A1 | * | 7/1993 | ............ F24F 3/153 |
| WO | 2011/111602 A1 | | 9/2011 | |
| WO | 2014/142313 A1 | | 9/2014 | |
| WO | 2014/174623 A1 | | 10/2014 | |

OTHER PUBLICATIONS

Office Action dated Jan. 8, 2019 issued in corresponding JP patent application No. 2017-555897 (and English translation).

* cited by examiner

DEHUMIDIFIER

CROSS REFERENCE TO RELATED APPLICATION

This application is a U.S. national stage application of International Application No. PCT/JP2015/085035, filed on Dec. 15, 2015, the contents of which are incorporated herein by reference.

TECHNICAL FIELD

The present invention relates to a dehumidifier configured to reduce the level of humidity in a room.

BACKGROUND

There is given a dehumidifier that attains low power consumption and easiness to carry with small size and weight by using a compressor that can perform a variable speed operation, as compared to the related-art dehumidifier using an induction motor (IM), which can perform only ON OFF operations (see, for example, Patent Literature 1).

PATENT LITERATURE

Patent Literature 1: Japanese Patent No. 3829625

For the prevention of global warming, flammable refrigerant having a global warming potential GWP of 6 or less is used as refrigerant to be used in the dehumidifier. However, in the low GWP refrigerant being flammable of this type, a latent heat amount of the refrigerant is smaller than an R134a refrigerant which has been used in the related art, thus leading to reduction in dehumidifying amount. In order to compensate for the reduction in dehumidifying amount, it is necessary to increase a refrigerant filling amount or the capacity of the heat exchanger and the capacity of the compressor. However, in the flammable refrigerant, there is a risk in that combustion may be caused in a case when refrigerant leakage occurs. Thus, it is not preferred to increase the refrigerant filling amount. Further, it is also not preferred to increase the capacity of the heat exchanger and the capacity of the compressor in the viewpoint of a demand to reduce a size in recent years. Further, in the low GWP refrigerant being flammable, there is a problem in that refrigerant having a large latent heat amount is strongly flammable. Therefore, in the case of using the low GWP refrigerant being flammable, it is required to significantly reduce the refrigerant filling amount and maintain the dehumidifying amount equivalent to that in the case of using the related-art refrigerant while suppressing the combustibility so as to secure safety.

When a compressor having a variable operating frequency is used as in the dehumidifier in Patent Literature 1, a desired refrigerant flow amount is obtained. Thus, even when refrigerant having a small latent heat amount is used, the smallness of the latent heat amount of the refrigerant to be used can be compensated for. Therefore, when the compressor having a variable operating frequency is used, unlike the case of using the compressor having a fixed operating frequency, it is unnecessary to increase the refrigerant filling amount or increase the capacity of the heat exchanger and the capacity of the compressor in order to compensate for the smallness of the latent heat amount of the refrigerant to be used. That is, even in the case of using the low GWP refrigerant being flammable, through the use of the compressor having a variable operating frequency, the increase in refrigerant filling amount and the increase in size of the dehumidifier body can be prevented.

However, when the refrigerant flow amount is increased, a pressure loss of the refrigerant is also increased, thus leading to the reduction in dehumidifying amount. As a result, a power consumption amount necessary for obtaining a desired dehumidifying amount is also increased.

SUMMARY

The present invention has been made in view of the above-mentioned matter, and has an object to obtain a dehumidifier, which is lightweight and compact even using low GWP refrigerant being flammable, and further is capable of reducing a pressure loss of the refrigerant to maintain a dehumidifying amount and reduce a power consumption amount.

According to one embodiment of the present invention, there is provided a dehumidifier, including: a housing; a refrigerant circuit, which is configured to allow low GWP refrigerant to circulate therethrough, the refrigerant circuit including a compressor having a variable operating frequency, a condenser, a pressure reducing device, and an evaporator, which are provided in the housing, the low GWP refrigerant being flammable and having a value of GWP of 6 or less; a blowing fan, which is provided in the housing, and is configured to take in air in a room into the housing and cause the taken-in air to pass through the evaporator and the condenser before blowing out the air from the housing into the room; and a water storage tank, which is provided below the evaporator, and is configured to accumulate dew condensation water generated in the evaporator, a number of refrigerant paths passing through the evaporator being greater than a number of refrigerant paths passing through the condenser.

The present invention has an object to obtain a dehumidifier, which is lightweight and compact even using low GWP refrigerant being flammable, and further is capable of reducing a pressure loss of the refrigerant to maintain a dehumidifying amount and reduce a power consumption amount.

DETAILED DESCRIPTION

Embodiment 1

<Configuration of Dehumidifier>

Figure 1:
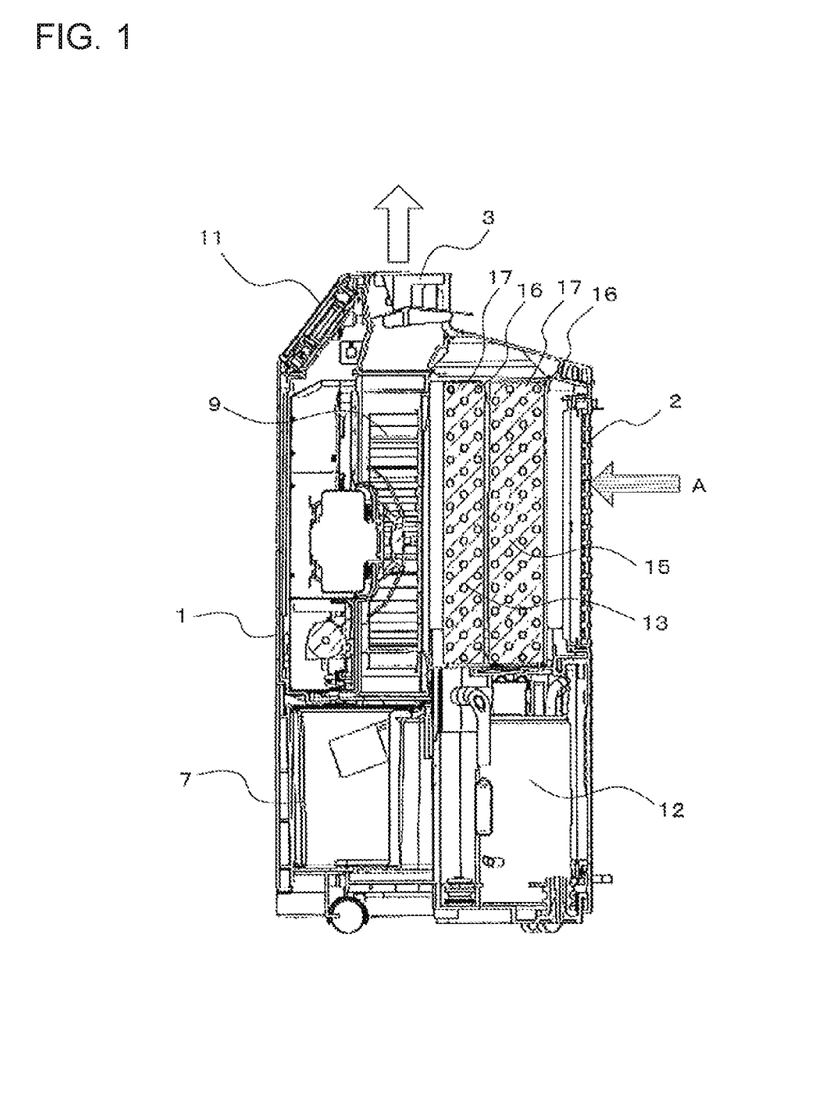
FIG. 1 is a longitudinal sectional view for illustrating an internal configuration of a dehumidifier according to Embodiment 1 of the present invention.
Figure 2:
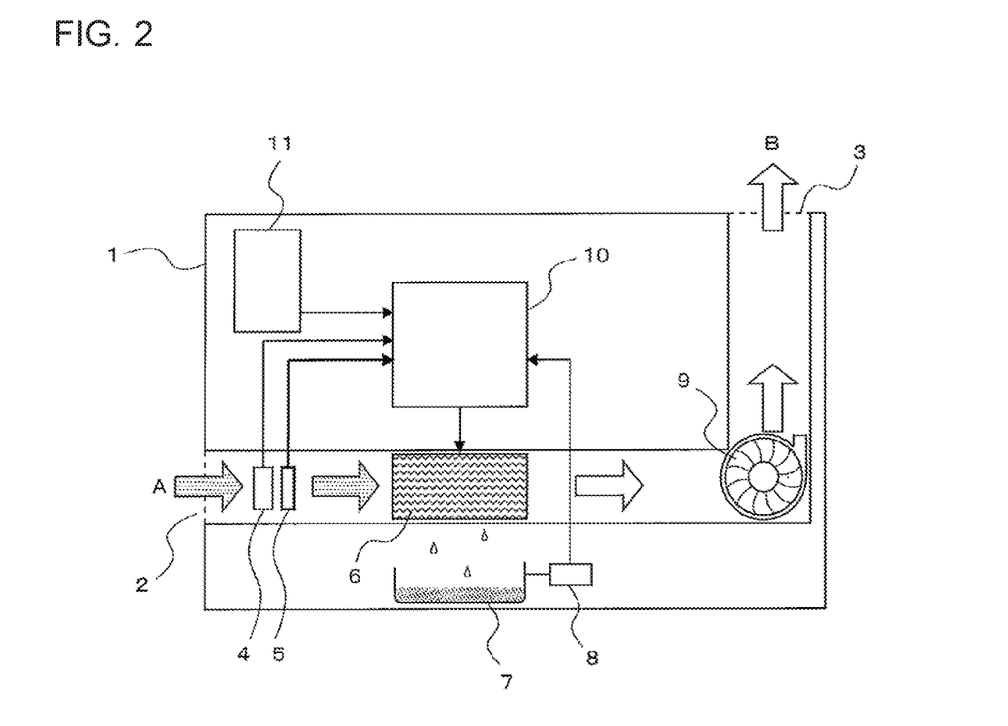
FIG. 2 is a schematic diagram for illustrating the internal configuration of the dehumidifier according to Embodiment 1 of the present invention.

FIG. 1 is a longitudinal sectional view for illustrating an internal configuration of a dehumidifier according to Embodiment 1 of the present invention. Further, FIG. 2 is a schematic diagram for illustrating the internal configuration of the dehumidifier according to Embodiment 1 of the present invention. As illustrated in FIG. 1 and FIG. 2, the dehumidifier according to Embodiment 1 includes a dehumidifier housing 1 formed so as to stand by itself, and has an air inlet 2 for taking in indoor air A into the dehumidifier housing 1, and an air outlet 3 for exhausting dry air B with its moisture being removed from the dehumidifier housing 1 into a room, which are formed in the dehumidifier housing 1. In this manner, an outer appearance of the dehumidifier is constructed.

In the dehumidifier housing 1, an evaporator 15 is provided on an air downstream side of the air inlet 2, and a condenser 13 is provided on an air downstream side of the evaporator 15. The evaporator 15 and the condenser 13 are each constructed by a fin-and-tube heat exchanger including a large number of heat transfer tubes 16 and a large number of fins 17.

As illustrated in FIG. 2, the dehumidifier according to Embodiment 1 includes a humidity sensor 4 configured to detect a humidity of the indoor air A sucked through the air inlet 2, and a temperature sensor 5 configured to detect a temperature of the indoor air A. In the following description, the humidity and the temperature detected by the humidity sensor 4 and the temperature sensor 5 are referred to as "detection humidity" and "detection temperature", respectively.

Further, the dehumidifier according to Embodiment 1 includes a dehumidifying device 6 configured to remove moisture contained in the indoor air A to generate the dry air B, and a water storage tank 7 configured to accumulate the moisture removed from the indoor air A by the dehumidifying device 6. The detailed configuration of the dehumidifying device 6 is described later.

In the water storage tank 7, there is provided a water level sensor 8 being a water amount detection sensor, which is configured to detect an amount of water in the water storage tank 7. As the water level sensor 8, there may be employed, for example, an optical water level sensor including a light emitting element and a light receiving element, or an ultrasonic water level sensor including an ultrasonic generating circuit and an ultrasonic receiving circuit.

The blowing fan 9 is provided in the inside of the dehumidifier housing 1. The blowing fan 9 is configured to generate an air flow. Specifically, the indoor air A is taken in into the dehumidifier housing 1 through the air inlet 2 and is caused to pass through the dehumidifying device 6, and then the dry air B dehumidified and dried in the dehumidifying device 6 is exhausted into a room through the air outlet 3.

The dehumidifier according to Embodiment 1 further includes a controller 10 and an operation unit 11. The operation unit 11 allows a user to perform an operation of the dehumidifier, and is a part to which information pieces such as selection of a dehumidifying mode and input of a set humidity are input by a user. The controller 10 is described in FIG. 3 below.

Figure 3:
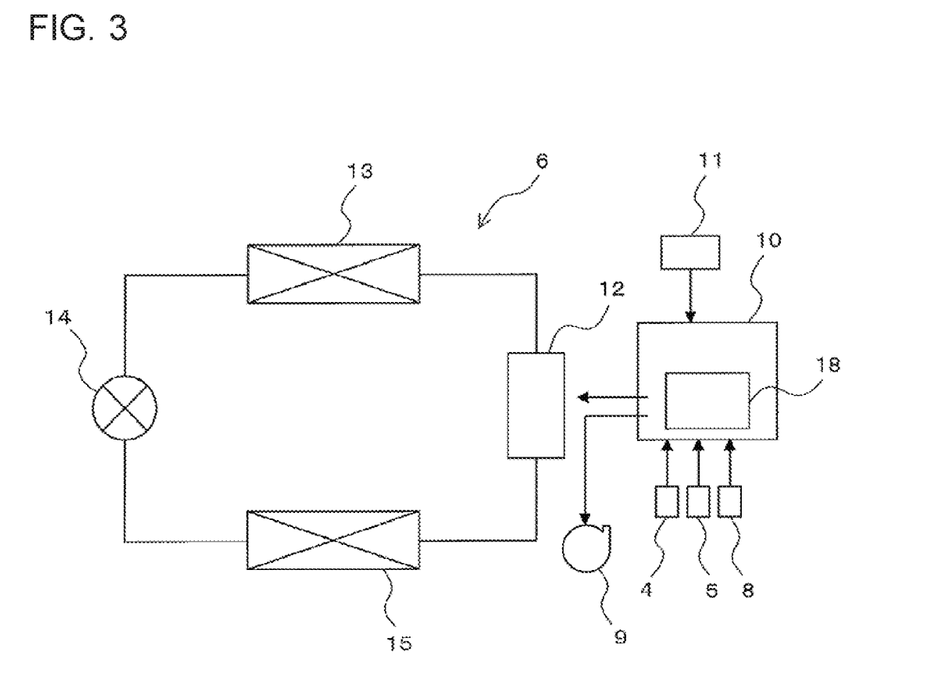
FIG. 3 is a diagram for illustrating a control system of the dehumidifier together with a refrigerant circuit constructing a dehumidifying device 6 of Embodiment 1 of the present invention.

FIG. 3 is a diagram for illustrating a control system of the dehumidifier together with a refrigerant circuit constructing the dehumidifying device 6 of Embodiment 1 of the present invention.

As illustrated in FIG. 3, the dehumidifying device 6 includes the refrigerant circuit formed by connecting the compressor 12, the condenser 13, the expansion valve 14, and the evaporator 15 to one another in series by pipes. The compressor 12 is configured to compress the refrigerant. The condenser 13 is configured to cool the refrigerant increased in pressure in the compressor 12. The expansion valve 14 is a pressure reducing device configured to reduce in pressure and expand the refrigerant cooled in the condenser 13. The evaporator 15 is configured to remove heat of the refrigerant reduced in pressure and expanded in the expansion valve 14. In this case, the expansion valve is employed as the pressure reducing device, but a capillary tube may be employed instead.

The controller 10 includes an inverter circuit 18. The inverter circuit 18 is a circuit configured to convert a direct-current voltage converted by a converter circuit (not shown) into an alternating-current voltage having a freely set voltage, frequency and phase. The controller 10 is configured to control the inverter circuit 18 based on input from the humidity sensor 4, the temperature sensor 5, and the water level sensor 8 and information input to the operation unit 11, and to control each frequency of alternating-current voltages to be supplied to the compressor 12 and the blowing fan 9 to be variable. The controller 10 may be constructed by hardware for implementing this function, such as a circuit device, or a computing device such as a microcomputer or a CPU and software to be executed by the computing device.

The control by the controller 10 is more specifically described. The controller 10 controls the dehumidifying device 6, and at the same time, controls the blowing fan 9 so that the detection humidity detected by the humidity sensor 4 becomes equal to the set humidity input from the operation unit 11. That is, the controller 10 determines the operating frequency of the compressor 12, and at the same time, determines the rotation speed of the blowing fan 9 so that the detection humidity detected by the humidity sensor 4 becomes equal to the set humidity input from the operation unit 11. Then, the controller 10 controls the inverter circuit 18 so that the operating frequency [Hz] of the compressor 12 becomes equal to the determined frequency. With this, the rotation speed of the compressor 12 is controlled to a rotation speed [rpm] per unit time corresponding to the determined operating frequency [Hz]. Further, the controller 10 controls the inverter circuit 18 so that the rotation speed [rpm] per unit time of the blowing fan 9 becomes equal to the determined rotation speed. In this case, an output of the compressor 12 is increased as the rotation speed per unit time is increased. Further, an output of the blowing fan 9 is increased as the rotation speed per unit time is increased.

Low GWP refrigerant being flammable is used in the refrigerant circuit. The low GWP refrigerant is refrigerant that has an extremely small influence on global warming as compared to refrigerant that is currently used, such as R134a or R410A. In this case, a refrigerant having a GWP of 6 or less, such as R290, R1234yf, or R1234ze is mainly used.

In order to reduce the GWP, it is necessary to shorten an atmospheric lifetime being a time period during which the refrigerant stably exists in the atmosphere. Being of a short atmospheric lifetime means that chemical responsiveness in the atmosphere is high, and that the combustibility is increased. Thus, in a case of using the low GWP refrigerant, it is necessary to reduce a refrigerant filling amount to reduce a risk of the flammability at the time of using the dehumidifier in a room, as compared to a case of using nonflammable refrigerant. In the view of the above, in Embodiment 1, the compressor having a variable operating frequency is used as the compressor 12 so that the refrigerant flow amount can be increased in accordance with a necessary dehumidifying amount. In this manner, a desired dehumidifying amount can be obtained even when the refrigerant filling amount is reduced.

Further, Embodiment 1 has the following feature. The number of refrigerant paths passing through the condenser 13 is set greater than the number of refrigerant paths passing through the evaporator 15. Thus, reduction in pressure loss of the refrigerant in the evaporator 15 is attained to avoid reduction in the dehumidifying amount due to reduction in refrigerant circulating amount, with the result that reduction in power consumption amount is attained. In the following, this matter is described.

Figure 4:
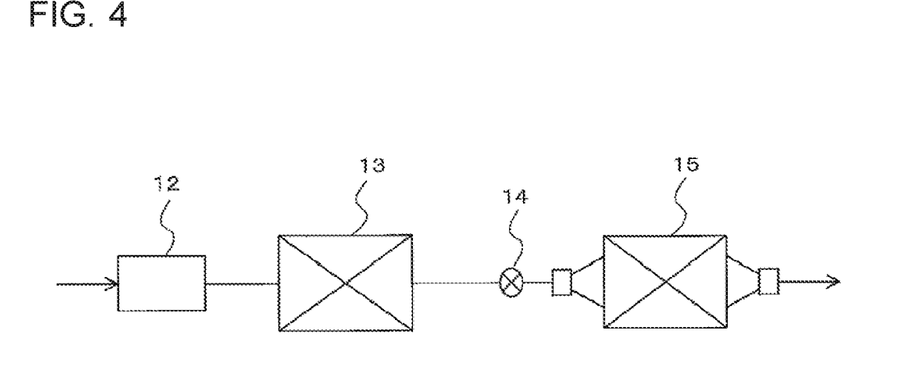
FIG. 4 is an explanatory diagram for illustrating the number of refrigerant paths of a refrigerant circuit of a dehumidifier according to Embodiment 2 of the present invention.

FIG. 4 is an explanatory diagram for illustrating the number of the refrigerant paths of the refrigerant circuit of the dehumidifier according to Embodiment 2 of the present invention.

FIG. 4 is an illustration of a case where the number of the refrigerant paths passing through the condenser 13 is one, and the number of the refrigerant paths passing through the evaporator 15 is two. That is, the evaporator 15 is an evaporator of a two-path type including two refrigerant paths. As described above, an in-pipe pressure loss can be reduced by increasing the number of the refrigerant paths.

Figure 5:
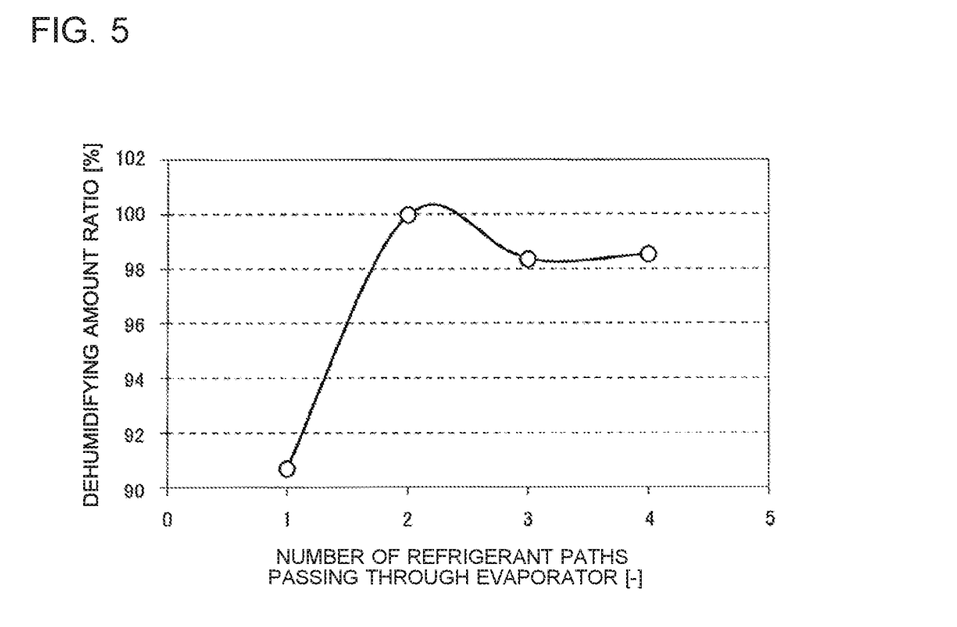
FIG. 5 is a graph for showing a result of measurement of a dehumidifying amount ratio in a case where the number of refrigerant paths passing through a condenser 13 is set to one, and the number of refrigerant paths passing through an evaporator 15 is changed in the dehumidifier according to Embodiment 2 of the present invention.

FIG. 5 is a graph for showing a result of measurement of a dehumidifying amount ratio in a case where the number of the refrigerant paths passing through the condenser 13 is set to one, and the number of the refrigerant paths passing through the evaporator 15 is changed in the dehumidifier according to Embodiment 2 of the present invention. In FIG. 5, the horizontal axis represents the number of the refrigerant paths passing through the evaporator 15 [-], and the vertical axis represents a dehumidifying amount ratio [%].

When the dehumidifying amount ratio in the case where the number of the refrigerant paths passing through the condenser 13 is one, and the number of the refrigerant paths passing through the evaporator 15 is two is defined as 100%, when the number of the refrigerant paths passing through the evaporator 15 is increased to 3 or 4, the dehumidifying amount ratio can be maintained at 98% or more. However, when the number of the refrigerant paths passing through the evaporator 15 is reduced to one, the dehumidifying amount ratio is drastically lowered to 91%. As described above, when the number of the refrigerant paths passing through the evaporator 15 is one, which is the same as the number of the refrigerant paths passing through the condenser 13, the refrigerant circulating amount is reduced, with the result that the dehumidifying amount is reduced. Even when the number of the refrigerant paths passing through the condenser 13 is increased, the dehumidifying amount is the same as that before the number of the refrigerant paths is increased. Thus, the dehumidifying amount cannot be increased. As described above, in order to compensate for the reduction in the dehumidifying amount due to the reduction in refrigerant filling amount, it is effective to increase the number of the refrigerant paths passing through the evaporator 15.

Next, an operation of the refrigerant circuit of the dehumidifying device 6 in the dehumidifier is described.

When the compressor 12 starts an operation, compressed high-temperature and high-pressure refrigerant gas flows into the condenser 13. The refrigerant flowing into the condenser 13 is liquefied by releasing heat to ambient air. The liquefied refrigerant is reduced in pressure in the expansion valve 14 to be brought into a two-phase gas-liquid state, and is caused to flow into the evaporator 15. The evaporator 15 has the two refrigerant paths as described above. The refrigerant flowing out from the expansion valve 14 is distributed into the two paths, and is caused to flow into the evaporator 15. The refrigerant caused to flow into the evaporator 15 receives heat from the ambient air to be brought into a gas state. Then, after the refrigerant in the gas state passes through the evaporator 15, the refrigerant merges with each other, and returns to the compressor 12.

As described above, in the dehumidifier using the flammable refrigerant, by increasing the refrigerant paths passing through the evaporator 15 more than those of the condenser 13, the reduction in refrigerant circulating amount due to the reduction in refrigerant pressure loss can be prevented. As a result, the dehumidifying amount can be maintained or increased without increasing the refrigerant filling amount.

Next, a dehumidifying operation of the dehumidifier is described.

The controller 10 executes the dehumidifying operation when it is detected that the dehumidifying mode is selected through the switching operation on the operation unit 11. In the dehumidifying operation, specifically, the blowing fan 9 is driven, and at the same time, the dehumidifying device 6 is driven so that the detection humidity detected by the humidity sensor 4 becomes equal to the set humidity input from the operation unit 11.

The controller 10 performs the control of the compressor 12 at the time of driving the dehumidifying device specifically as described below. That is, when a difference between the detection humidity and the set humidity is smaller than a preset predetermined value, the operating frequency is determined to be A[Hz], and when the difference between the detection humidity and the set humidity is larger than the preset predetermined value, the operating frequency is determined to be B(>A)[Hz]. The control of the compressor 12 is not limited to a method of controlling the operating frequency in two stages as described above, and besides, for example, the operating frequency may be controlled in a plurality of stages.

Then, the controller 10 controls the inverter circuit 18 so that the operating frequency of the compressor 12 becomes equal to the determined operating frequency to control the rotation speeds of the compressor 12 and the blowing fan 9.

When the blowing fan 9 is driven as described above, the indoor air A is taken in into the dehumidifying device 6 in the dehumidifier housing 1 through the air inlet 2. Further, when the compressor 12 is driven, the refrigerant is circulated through the refrigerant circuit in the dehumidifying device 6. The indoor air A sucked through the air inlet 2 is first caused to flow into the evaporator 15. The indoor air A caused to flow into the evaporator 15 is cooled to a dew point or less by the evaporator 15, and the moisture in the air is condensed to dehumidify the air. The condensed moisture is received in the water storage tank 7 to be accumulated, and is discharged to the outside. In this manner, the indoor air A passes through the evaporator 15 to be cooled, thereby lowering an absolute humidity.

The dehumidified air turns into the dry air B, and passes through the condenser 13 to be heated. Then, the air is caused to pass through a blowing duct by the blowing fan 9, and is blown out to an internal space through the air outlet 3.

As described above, according to Embodiment 1, the operating frequency of the compressor 12 is variable so that the refrigerant circulating amount can be increased. Thus, unlike a case of using a compressor having a fixed operating frequency, the desired dehumidifying amount can be obtained without increasing the capacity of the evaporator 15 and the capacity of the compressor 12. Thus, it is possible to provide a dehumidifier, which is not significantly reduced in dehumidifying amount and has an extremely small influence on global warming as well as being lightweight and compact, without increasing the size of the dehumidifier body.

Further, the operating frequency is variable, and hence the refrigerant circulating amount can be increased as necessary. Thus, unlike the case where the operating frequency is constant, it is unnecessary to increase the refrigerant filling amount. That is, the filling amount of the flammable refrigerant can be reduced, thereby enhancing the safety of the dehumidifier. That is, it is possible to construct a dehumidifier, which can be used in a room even using low GWP refrigerant which has a small influence on global warming and is flammable as the refrigerant.

Further, the number of the refrigerant paths passing through the evaporator 15 is set greater than the number of the refrigerant paths passing through the condenser 13. Thus, the reduction in refrigerant circulating amount due to the reduction in refrigerant pressure loss can be prevented, and thus, the dehumidifying amount can be maintained or increased without increasing the refrigerant filling amount. As a result, increase in power consumption amount that is necessary to obtain the desired dehumidifying amount can be prevented.

Here, there is described the example of the case where the number of the refrigerant paths passing through the evaporator 15 is two, and the number of the refrigerant paths passing through the condenser 13 is one. However, the present invention is not limited to such configuration. That is, the present invention may encompass other configurations as long as the evaporator 15 and the condenser 13 are each a heat exchanger of a multi-path type including a plurality of refrigerant paths, and the number of the refrigerant paths passing through the evaporator is set greater than the number of the refrigerant paths passing through the condenser.

Embodiment 2

The dehumidifier according to Embodiment 1 described above has a feature in that the number of the refrigerant paths passing through the evaporator 15 is greater than the number of the refrigerant paths passing through the condenser 13. Embodiment 2 relates to a dehumidifier in which the flow passage sectional area of the evaporator 15 is larger than the flow passage sectional area of the condenser 13. Other configurations and operations of the dehumidifier are the same as those of Embodiment 1. Matters of Embodiment 2, which are different from those of Embodiment 1, are mainly described below.

In the evaporator 15, the density of the refrigerant passing therethrough is lower and the refrigerant flow rate is higher than in the condenser 13. Thus, the pressure loss is liable to be increased. When the pressure loss is increased, the refrigerant circulating amount is reduced, thus leading to the reduction in dehumidifying amount. Therefore, the flow passage sectional area of the evaporator 15 is set lager than the flow passage sectional area of the condenser 13, thereby being capable of reducing the refrigerant pressure loss in the refrigerant circuit of the dehumidifier. The flow passage sectional area is a product of the number of the refrigerant paths and the sectional area of each of the heat transfer tubes 16.

Incidentally, the stagnating amount of the refrigerant is large at an outlet of the condenser 13 in the refrigerant circuit. The refrigerant at the outlet of the condenser 13 is in a liquid state. Thus, when the refrigerant in the liquid state stagnates without circulating, the dehumidifying operation is performed with a "remaining refrigerant amount" excluding the amount of the liquid refrigerant that stagnates. Therefore, it is necessary to fill an amount of the refrigerant having considered the stagnation of the liquid refrigerant. In another point of view, when the stagnation of the liquid refrigerant can be eliminated, the refrigerant filling amount can be reduced. In order to eliminate the stagnation of the liquid refrigerant at the outlet of the condenser 13, it is effective to reduce a diameter of each of the heat transfer tubes 16 of the condenser 13. A result of an examination of this matter is shown in FIG. 6.

Figure 6:
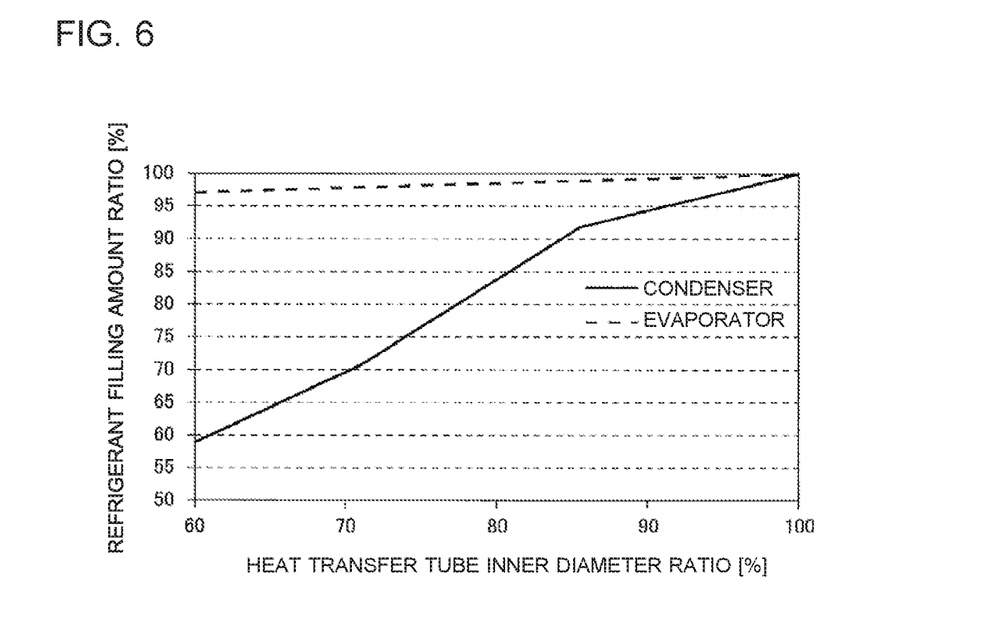
FIG. 6 is a graph for showing a refrigerant filling amount ratio in a case where an inner diameter of each of the heat transfer tubes 16 of each of the condenser 13 and the evaporator 15 is reduced from that of the related-art heat transfer tubes.

FIG. 6 is a graph for showing a refrigerant filling amount ratio in a case where an inner diameter of each of the heat transfer tubes 16 of each of the condenser 13 and the evaporator 15 is reduced from that of the related-art heat transfer tubes. In FIG. 6, the horizontal axis represents a heat transfer tube inner diameter ratio [%] being a ratio of an inner diameter of a heat transfer tube being an object to be examined to an inner diameter of a related-art heat transfer tube. The vertical axis represents a refrigerant filling amount ratio [%] being a ratio of a refrigerant filling amount necessary for a case of the heat transfer tube inner diameter ratio being the object to be examined to a refrigerant filling amount necessary for the related-art heat transfer tube inner diameter ratio.

In the evaporator 15, even when the heat transfer tube inner diameter ratio is set to 60%, that is, the diameter is reduced by 40% from that of the related art, the refrigerant filling amount is only reduced to about 97%. In contrast, when the heat transfer tubes 16 of the condenser 13 are reduced in diameter by 40%, the refrigerant filling amount can be reduced to about 60% of the related art.

That is, in Embodiment 2, as described above, the flow passage sectional area of the evaporator 15 is set larger than the flow passage sectional area of the condenser 13. Conversely, the flow passage sectional area of the condenser 13 is set smaller than the flow passage sectional area of the evaporator 15. In order to set a difference in flow passage sectional area between the evaporator 15 and the condenser 13, when the flow passage sectional area of the condenser 13 is to be reduced by reducing the diameter of each of the heat transfer tubes 16 of the condenser based on FIG. 6, the refrigerant filling amount can be reduced without reducing the dehumidifying amount.

As described above, according to Embodiment 2, the same effects as those of Embodiment 1 are obtained. Further, the flow passage sectional area of the evaporator 15 is set larger than that of the condenser 13. Consequently, the following effect is obtained. That is, the refrigerant pressure loss in the evaporator 15 can be reduced, and the stagnating amount of the liquid refrigerant at the outlet of the condenser 13 can be reduced. As a result, the dehumidifying amount can be maintained or increased.

Further, circular pipes each having a small diameter or flat pipes are used as the heat transfer tubes 16, and hence the capacity of the condenser 13 can be reduced. With this, the refrigerant filling amount is significantly reduced, and the combustibility of the refrigerant is ameliorated. Thus, it is possible to provide a highly safe dehumidifier that has a small influence on global warming.

Embodiment 3

In Embodiment 2 described above, the flow passage sectional area of the evaporator 15 is larger than the flow passage sectional area of the condenser 13. Embodiment 3 relates to a dehumidifier having a feature in that fin pitches of the evaporator 15 are set smaller than fin pitches of the condenser 13 to reduce leakage of the flammable refrigerant. Other configurations and operations of the dehumidifier are the same as those of Embodiment 1. Matters of Embodiment 3, which are different from those of Embodiment 1, are mainly described below.

In the dehumidifier, the indoor air first passes through the evaporator 15 to be dehumidified, and the air is heated in the condenser 13 and is released to a room. Therefore, air containing contaminated substances that may corrode the heat exchanger first passes through the evaporator 15. The evaporator 15 causes the moisture contained in the indoor air to be condensed, and hence the contaminated substances are liable to adhere to the evaporator 15. That is, the evaporator 15 has a higher corrosivity than the condenser 13. Therefore, there is a higher chance of a through hole being generated as a result of corrosion to cause leakage of the refrigerant in the evaporator 15, as compared to the condenser 13.

In the dehumidifier, the flammable refrigerant is filled in the refrigerant circuit. In a sense, the flammable refrigerant exists in a room. Therefore, it is extremely important to prevent the refrigerant leakage in the dehumidifier. Thus, corrosion prevention of the heat exchanger is indispensable.

In view of the above, in Embodiment 3, the fin pitches of the evaporator 15 that is liable to be corroded as compared to the condenser 13 are set smaller than the fin pitches of the condenser 13, and the number of the fins 17 of the evaporator 15 is set greater than that of the condenser 13. With this, a corrosion action due to the contaminated substances is concentrated not on the heat transfer tubes 16 but relatively on the fins 17, thereby preventing the generation of the through hole in the evaporator 15. Thus, it is possible to provide a highly reliable dehumidifier.

Further, in a general heat exchanger using copper heat transfer tubes and aluminum fins, a potential of aluminum is lower than that of copper. Thus, corrosion of the aluminum fins is promoted with a sacrificial corrosion protection effect, and corrosion of the copper heat transfer tubes is prevented, thereby being capable of preventing the generation of the through hole. Therefore, in the evaporator 15, through use of the copper heat transfer tubes 16 as the heat transfer tubes 16 and the aluminum fins as the fins 17, the generation prevention effect of the through hole can further be enhanced.

As described above, according to Embodiment 3, the same effects as those of Embodiment 1 are obtained. Further, the fin pitches of the evaporator 15 are set smaller than the fin pitches of the condenser 13. Consequently, the following effect is obtained. That is, the corrosion action due to the contaminated substances is concentrated not on the heat transfer tubes 16 but relatively on the fins 17, thereby being capable of preventing the generation of the through hole in the evaporator 15. Thus, it is possible to provide a highly reliable dehumidifier, which is excellent in corrosion resistance, and prevents the leakage of the refrigerant.

Embodiment 4

Embodiment 3 described above has a feature in that the fin pitches of the evaporator 15 are smaller than the fin pitches of the condenser 13. Embodiment 4 relates to a dehumidifier having a feature in that the thickness of each of the heat transfer tubes 16 of the evaporator 15 is increased. Other configurations and operations of the dehumidifier are the same as those of Embodiment 1. Matters of Embodiment 4, which are different from those of Embodiment 1, are mainly described below.

As described above, the evaporator 15 is liable to be corroded as compared to the condenser 13, and hence the thickness of each of the heat transfer tubes 16 of the evaporator 15 is at least set larger than the thickness of each of the heat transfer tubes 16 of the condenser 13. With this, even when the fins 17 of the dehumidifier are corroded, the generation of the through hole due to the corrosion of the heat transfer tubes 16 is prevented, thereby reducing the refrigerant leakage.

As described above, according to Embodiment 4, the same effects as those of Embodiment 1 are obtained. Further, the thickness of each of the heat transfer tubes 16 of the evaporator 15 is set larger than the thickness of each of the heat transfer tubes 16 of the condenser 13. Consequently, the following effect is obtained. That is, the generation of the through hole in the evaporator 15 can be prevented. Thus, it is possible to provide a highly reliable dehumidifier, which is excellent in corrosion resistance, and prevents the leakage of the refrigerant.

Copper or dissimilar metals each having a potential lower than that of each of the copper pipes as the heat transfer tubes 16 may be coated on a surface of each of the copper pipes to increase of the thickness of each of the heat transfer tubes 16. Further, Embodiment 4 may be combined with Embodiment 3. In this case, the corrosion prevention effect of the heat transfer tubes 16 is further enhanced. Thus, it is possible to provide a highly safe dehumidifier.

Embodiment 5

Embodiment 4 described above has a feature in that the thickness of each of the heat transfer tubes 16 of the evaporator 15 is larger than the thickness of each of the heat transfer tubes 16 of the condenser 13. Embodiment 5 relates to a dehumidifier having a feature in that a "single refrigerant consisting of a refrigerant containing hydrofluoroolefin having a double bond between carbon and carbon as a base component" or a "mixture refrigerant containing the single refrigerant" is used as the refrigerant. Other configurations and operations of the dehumidifier are the same as those of Embodiment 1. Matters of Embodiment 5, which are different from those of Embodiment 1, are mainly described below.

Through use of any one of the above-mentioned two refrigerants, it is possible to provide a dehumidifier that has a low GWP and is environmentally friendly. In particular, R1234yf and R1234ze that are hydrofluoroolefin-based refrigerants, have similar physical properties to R134a that has been generally used in the related art in the dehumidifier. Therefore, in a case of constructing a dehumidifier using any one refrigerant of R1234yf and R1234ze, the existing heat exchanger can be used. Further, R1234yf and R1234ze are low GWP refrigerants that are used in a car air-conditioning apparatus, and are inexpensive. Further, R1234yf and R1234ze are flammable, specifically, are slightly flammable, and are not strongly flammable like R290. Thus, R1234yf and R1234ze are suitable for the dehumidifier to be installed in a room also in the viewpoint of safety.

As described above, according to Embodiment 5, the same effects as those of Embodiment 1 are obtained. Further, the "single refrigerant consisting of a refrigerant containing hydrofluoroolefin having a double bond between carbon and carbon as a base component" or the "mixture refrigerant containing the single refrigerant" is used as the refrigerant. Consequently, the following effect is obtained. That is, it is possible to provide a dehumidifier that has a low GWP and is environmentally friendly.

Embodiment 6

In Embodiment 5 described above, the "single refrigerant consisting of a refrigerant containing hydrofluoroolefin having a double bond between carbon and carbon as a base component" or the "mixture refrigerant containing the single refrigerant" is used as the refrigerant. Embodiment 6 relates to a dehumidifier using, as the refrigerant, a mixture refrigerant in which nonflammable refrigerant is mixed into the refrigerant containing hydrofluoroolefin having a double bond between carbon and carbon as a base component. Other configurations and operations of the dehumidifier are the same as those of Embodiment 1. Matters of Embodiment 6, which are different from those of Embodiment 1, are mainly described below.

When a refrigerant in which nonflammable refrigerant is mixed into a hydrofluoroolefin-based refrigerant such as R1234yf or R1234ze is used, the slight flammability of the refrigerant is weakened, thereby enhancing the safety of the dehumidifier.

Incidentally, in the refrigerant circuit, refrigerating machine oil is used as working fluid other than the refrigerant. Degradation of the working fluid containing the refrigerant and the refrigerating machine oil is rapidly progressed as the temperature is raised, and, for example, the degradation is mainly caused at a sliding portion in the compressor 12, which is raised in temperature due to frictional heat. Further, additive agents in the refrigerating machine oil are similarly degraded by heat. As the additive agents, there are given, for example, antiwear agents or antioxidizing agents. Such degraded matters are insoluble into the refrigerating machine oil and the refrigerant, and are generally called sludge. When a large amount of sludge is generated, the flow passage may be blocked in the refrigerant circuit at the pipe portion where the flow passage sectional area is small. In such a situation, the flow passage resistance is increased to reduce the circulating amount of the refrigerant, and then the refrigeration capacity is reduced, thus leading to the reduction in dehumidifying amount.

However, when the nonflammable refrigerant is mixed into the refrigerant containing hydrofluoroolefin having a double bond between carbon and carbon as a base component, the chemical responsiveness of the hydrofluoroolefin-based refrigerant can be suppressed. Therefore, even when the sliding portion is raised in temperature in the compressor 12, resolution or polymerization of the hydrofluoroolefin-based refrigerant can be prevented, thereby being capable of preventing the generation of the sludge in the refrigerant.

As described above, according to Embodiment 6, the same effects as those of Embodiment 1 are obtained. Further, as the refrigerant, the mixture refrigerant in which the nonflammable refrigerant is mixed into the refrigerant containing hydrofluoroolefin having a double bond between carbon and carbon as a base component is used. Consequently, the following effects are obtained. That is, the slight flammability of the refrigerant is weakened, thereby being capable of enhancing the safety of the dehumidifier. Further, the generation of the sludge can be prevented. With this, the sludge clogging of the pipes in devices constructing the refrigerant circuit and the compressor 12 is prevented. Thus, it is possible to provide a dehumidifier that is highly reliable for a long term.

Embodiment 7

In Embodiment 6 described above, used is a mixture refrigerant in which nonflammable refrigerant is mixed into the refrigerant containing hydrofluoroolefin having a double bond between carbon and carbon as a base component. In Embodiment 6 described above, the mixing ratio of the nonflammable refrigerant is not specifically defined. In contrast, Embodiment 7 has a feature in that the nonflammable refrigerant is mixed into the "refrigerant containing hydrofluoroolefin having a double bond between carbon and carbon as a base component" at a concentration of 10% to 12%. Other configurations and operations of the dehumidifier are the same as those of Embodiment 1. Matters of Embodiment 7, which are different from those of Embodiment 1, are mainly described below.

For example, R134a being nonflammable refrigerant is mixed into R1234yf or R1234ze at a concentration of, for example, 12% or less. in Europe, F-Gas such as HFC (hydrofluorocarbon) is regulated, and a mixture refrigerant in which R134a being nonflammable refrigerant is mixed into R1234yf or R1234ze at a concentration of, for example, 12% or less satisfies the reference value of F-Gas Regulation, that is, a GWP of 150 or less. Further, an effect of weakening the combustibility is obtained as compared to a case of using R1234yf or R1234ze as it is as a pure substance.

As described above, according to Embodiment 7, the same effects as those of Embodiment 1 and Embodiment 6 are obtained. Further, as the refrigerant, the mixture refrigerant in which the nonflammable refrigerant is mixed into the refrigerant containing hydrofluoroolefin having a double bond between carbon and carbon as a base component at a concentration of 10% to 12% is used. Consequently, the following effects are obtained. That is, the GWP of 150 or less, which is the reference value of F-Gas Regulation in Europe is satisfied, and, in addition, the effect of weakening the combustibility is obtained as compared to the case of using the pure substance.

Embodiment 8

In Embodiment 7 described above, the refrigerant in which the nonflammable refrigerant is mixed into the refrigerant containing hydrofluoroolefin having a double bond between carbon and carbon as a base component at a concentration of 10% to 12% is used. Embodiment 8 relates to a dehumidifier having a feature in that the refrigerant filling amount is set equal to or smaller than a refrigerant amount calculated by "Refrigerant Amount [g]=7.03×Dehumidifying Amount [l/day]−1.91" (hereinafter referred to as Expression (1)). Other configurations and operations of the dehumidifier are the same as those of Embodiment 1. Matters of Embodiment 8, which are different from those of Embodiment 1, are mainly described below.

Figure 7:
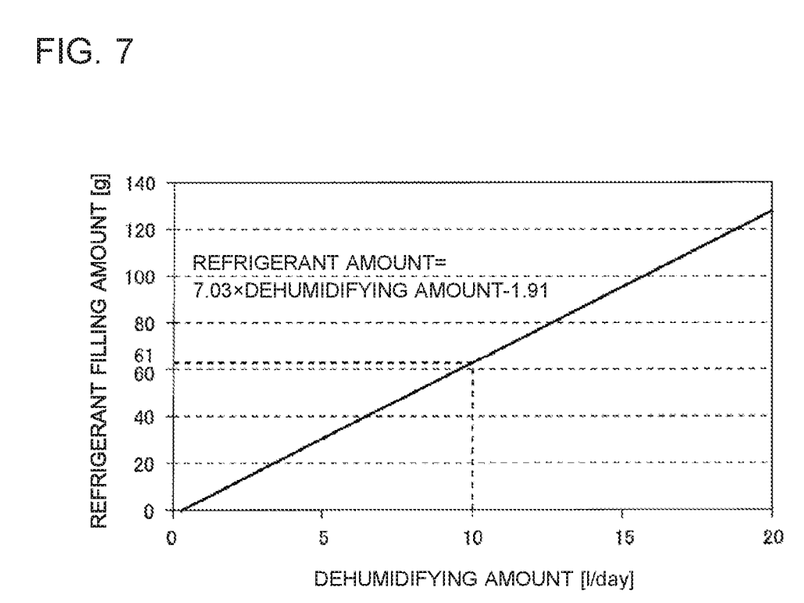
FIG. 7 is a graph for showing a refrigerant filling amount in accordance with a dehumidifying amount, which satisfies 5.4% or less being a combustion concentration lower limit.

FIG. 7 is a graph for showing a refrigerant filling amount in accordance with the dehumidifying amount, which satisfies 5.4% or less being a combustion concentration lower limit.

The graph shown in FIG. 7 shows Expression (1) described above, and the refrigerant filling amount obtained from the graph is an upper limit of the refrigerant amount which satisfies 5.4% or less being the combustion concentration lower limit with respect to a dehumidifying amount at the time when a dry-bulb temperature is 27 degrees Celsius and a relative humidity is 60%. That is, in a case where a desired dehumidifying amount is, for example, 10[l/day], through setting of the refrigerant filling amount to be 61[g] or less, even when all of the refrigerant filling amount leaks in a room, the refrigerant concentration in the room is 5.4% or less being the combustion concentration lower limit (lower limit of a refrigerant concentration range in which the combustion is caused), and the combustion is not caused. Conversely, when the refrigerant filling amount exceeds 61[g], the refrigerant concentration in a room exceeds 5.4% being the combustion concentration lower limit, and there is a risk in that the combustion is caused.

More specifically, in the 10L model with a dehumidifying amount of 10 [l/day], for example, a space to be dehumidified is a room of from 11 tatami mats to 14 tatami mats. Therefore, as long as the space to be dehumidified has the capacity of a room of 11 tatami mats, even when all of 61[g] of the refrigerant filled in the dehumidifier leaks, the refrigerant concentration in the room does not exceed 5.4% being the combustion concentration, thereby being capable of preventing the combustion. Therefore, the refrigerant filling amount 61[g] is an upper limit of the refrigerant amount range in which the combustion can be prevented in the 10L model.

The refrigerant filling amount at which the combustion is not caused at the combustion concentration lower limit (combustion lower limit refrigerant concentration) being 5.4% at the time when the dry-bulb temperature is 27 degrees Celsius and the relative humidity is 60% is 61 [g], which is based on Expression (2) described below.

Refrigerant Amount [kg]=Capacity of Room [$m^3$]× (Combustion Lower Limit Refrigerant Concentration [%]/100)×Refrigerant Density [$kg/m^3$] at 27 degrees Celsius That is, Expression (1) described above corresponds to a relational expression between the dehumidifying amount and the refrigerant amount, which is transformed using Expression (2) from the relationship between the desired dehumidifying amount and the capacity of the room.

Further, the numerical value of "5.4%" indicating the lower limit of the combustion concentration is based on data showing results of a combustion test conducted under a condition that R1234ze is used as the refrigerant and the relative humidity is 60%. It is supposed that the same combustion test results are obtained also in a case of using R1234yf, which is slightly flammable refrigerant as in R1234ze, and a combustion concentration lower limit in the case of using R1234yf is also "5.4%", which is the same as in R1234ze.

Therefore, when R1234yf or R1234ze is used as the refrigerant, the amount equal to or smaller than the refrigerant filling amount obtained from Expression (1) described above in accordance with the desired dehumidifying amount is filled. Thus, even when all of the filled refrigerant leaks in a room, the refrigerant concentration in the room does not reach the combustion concentration. Therefore, the dehumidifier can be used safely.

As described above, according to Embodiment 8, the same effects as those of Embodiment 1 are obtained. Further, the refrigerant filling amount is set equal to or smaller than the refrigerant amount satisfying Expression (1) described above. Consequently, the following effect is obtained. That is, as described above, even when all of the refrigerant filled inside the dehumidifier leaks in a room, the refrigerant concentration in the room does not reach the combustion concentration. Therefore, the dehumidifier can be used safely.

The refrigerant amount obtained from Expression (1) described above is such an amount that R1234yf or R1234ze can be singly filled in the dehumidifier from the viewpoint of safe use. Moreover, the refrigerant filling amount may be increased by mixing nonflammable refrigerant.

Further, the case of using R1234yf or R1234ze is described. However, even using a refrigerant described below, a highly safe dehumidifier can similarly be obtained. That is, there is given a refrigerant which is classified as slightly flammable that is close to Class 2L defined in ISO817 and ASHRAE34 and has a gas density at 27 degrees Celsius of 38 $kg/m^3$ or less. Using the refrigerant, the refrigerant filling amount is adjusted to be equal to or smaller than the refrigerant amount obtained from Expression (1) described above. Thus, it is possible to obtain a highly safe dehumidifier that does not cause combustion even when the refrigerant leaks in a room.

Embodiments 1 to 8 described above are each described as another embodiment. However, characteristic configurations of each of the embodiments may be combined as appropriate to construct a dehumidifier. For example, Embodiment 3 and Embodiment 4 may be combined with each other, thereby being capable of further enhancing the corrosion prevention effect. Thus, it is possible to provide a highly safe dehumidifier. Further, in each of Embodiments 1 to 8, Modification Example applied to the same component part is similarly applied to other Embodiments than Embodiment in which Modification Example is described.

The invention claimed is:

1. A dehumidifier, comprising:
   a housing;
   a refrigerant circuit, which is configured to allow low global warming potential (GWP) refrigerant to circulate therethrough, the refrigerant circuit including a compressor having a variable operating frequency, a condenser, a pressure reducing device, and an evaporator, which are provided in the housing, the low GWP refrigerant being flammable and having a value of GWP of 6 or less;
   a blowing fan, which is provided in the housing, and is configured to take in air into the housing and cause the taken-in air to pass through the evaporator and the condenser before blowing out the air from the housing; and
   a water storage tank, which is provided below the evaporator, and is configured to accumulate dew condensation water generated in the evaporator,
   a number of refrigerant paths passing through the evaporator being greater than a number of refrigerant paths passing through the condenser,
   a fin pitch of the evaporator being smaller than a fin pitch of the condenser.

2. The dehumidifier of claim 1,
   wherein the low GWP refrigerant is a single refrigerant containing hydrofluoroolefin having a double bond between carbon and carbon as a base component or a mixture refrigerant containing the single refrigerant.

3. The dehumidifier of claim 1,
wherein the low GWP refrigerant is a mixture refrigerant in which nonflammable refrigerant is mixed into a refrigerant containing hydrofluoroolefin having a double bond between carbon and carbon as a base component.

4. The dehumidifier of claim 3,
wherein the nonflammable refrigerant is mixed into the mixture refrigerant at a concentration of 10% to 12%.

5. The dehumidifier of claim 1,
wherein a refrigerant amount filled in the dehumidifier is equal to or smaller than a refrigerant amount calculated by the following expression based on a desired dehumidifying amount:

Refrigerant Amount [g]=7.03×Dehumidifying Amount [1/day]−1.91.

6. The dehumidifier of claim 1,
wherein a flow passage sectional area of the evaporator is larger than a flow passage sectional area of the condenser.

7. A dehumidifier, comprising:
a housing;
a refrigerant circuit, which is configured to allow low global warming potential (GWP) refrigerant to circulate therethrough, the refrigerant circuit including a compressor having a variable operating frequency, a condenser, a pressure reducing device, and an evaporator, which are provided in the housing, the low GWP refrigerant being flammable and having a value of GWP of 6 or less;
a blowing fan, which is provided in the housing, and is configured to take in air into the housing and cause the taken-in air to pass through the evaporator and the condenser before blowing out the air from the housing; and
a water storage tank, which is provided below the evaporator, and is configured to accumulate dew condensation water generated in the evaporator,
a number of refrigerant paths passing through the evaporator being greater than a number of refrigerant paths passing through the condenser,
a thickness of a heat transfer tube of the evaporator being larger than a thickness of a heat transfer tube of the condenser.

8. The dehumidifier of claim 7,
wherein a flow passage sectional area of the evaporator is larger than a flow passage sectional area of the condenser.

9. The dehumidifier of claim 7,
wherein a fin pitch of the evaporator is smaller than a fin pitch of the condenser.

* * * * *